(12) United States Patent
Uhlhorn et al.

(10) Patent No.: US 8,348,523 B1
(45) Date of Patent: Jan. 8, 2013

(54) NETWORK TOPOLOGY MODULE AND SYSTEM

(75) Inventors: Brian L. Uhlhorn, St. Paul, MN (US); Howard J. Schantz, Inver Grove Heights, MN (US)

(73) Assignee: Lockheed Martin Corporation, Bethesda, MD (US)

( * ) Notice: Subject to any disclaimer, the term of this patent is extended or adjusted under 35 U.S.C. 154(b) by 467 days.

(21) Appl. No.: 12/576,705

(22) Filed: Oct. 9, 2009

(51) Int. Cl.
*G02B 6/36* (2006.01)
*G02B 6/00* (2006.01)

(52) U.S. Cl. .......................................... 385/89

(58) Field of Classification Search .................. 359/124, 359/118–120, 133, 127; 385/14, 16, 88, 385/147, 24; 398/66–68, 70, 71, 79, 82, 398/135
See application file for complete search history.

(56) References Cited

U.S. PATENT DOCUMENTS

| | | | | |
|---|---|---|---|---|
| 4,140,367 A * | 2/1979 | Makuch et al. | ................. | 385/59 |
| 4,446,515 A * | 5/1984 | Sauer et al. | ................. | 709/252 |
| 5,303,078 A | 4/1994 | Brackett et al. | | |
| 5,317,656 A * | 5/1994 | Moslehi et al. | ................. | 385/12 |
| 5,661,585 A * | 8/1997 | Feldman et al. | ................. | 398/63 |
| 5,724,167 A * | 3/1998 | Sabella | ............ | 398/50 |
| 5,757,527 A * | 5/1998 | Mock | ................. | 398/45 |
| 5,774,698 A * | 6/1998 | Olnowich | .............. | 712/1 |
| 5,943,150 A * | 8/1999 | Deri et al. | ................. | 398/89 |
| 6,417,944 B1 | 7/2002 | Lahat et al. | | |
| 6,643,042 B1 | 11/2003 | Nishio et al. | | |
| 7,371,014 B2 * | 5/2008 | Willis et al. | ................. | 385/89 |
| 7,613,395 B2 * | 11/2009 | Huffman et al. | ................. | 398/72 |
| 7,793,026 B1 * | 9/2010 | Abraham et al. | ............. | 710/303 |
| 7,899,295 B2 * | 3/2011 | Rapp et al. | ................. | 385/135 |
| 7,949,255 B2 * | 5/2011 | Zou | .............. | 398/58 |
| 7,962,036 B1 * | 6/2011 | Uhlhorn et al. | ................. | 398/61 |
| 7,962,042 B2 * | 6/2011 | Deas | ............. | 398/115 |
| 2007/0014510 A1 * | 1/2007 | Kusama | ............. | 385/16 |
| 2007/0019904 A1 * | 1/2007 | Bulow | ............. | 385/16 |
| 2007/0249193 A1 * | 10/2007 | Penumatcha et al. | ......... | 439/125 |
| 2008/0131054 A1 | 6/2008 | Kim et al. | | |
| 2009/0052897 A1 * | 2/2009 | Kazawa et al. | ................. | 398/71 |
| 2009/0074423 A1 * | 3/2009 | Bernard et al. | ............... | 398/135 |
| 2010/0119228 A1 * | 5/2010 | Zhou et al. | ................. | 398/66 |
| 2010/0287322 A1 * | 11/2010 | Abraham et al. | ............. | 710/304 |
| 2011/0110662 A1 * | 5/2011 | Wellbrock et al. | .............. | 398/45 |
| 2011/0142407 A1 * | 6/2011 | Rapp et al. | ................. | 385/135 |

* cited by examiner

*Primary Examiner* — Akm Enayet Ullah
(74) *Attorney, Agent, or Firm* — Hamre, Schumann, Mueller & Larson, P.C.

(57) ABSTRACT

A computing architecture and network topology definition module which provide the ability to tailor a hardware network topology to differing needs. Computing resources are interconnected into a network implementation using an optical wavelength division multiplexing (WDM) star/coupler approach. The overall topology for the network is defined by the network topology definition module, which is a removable device that defines the network topology and communication connectivity between the computing resources. Replacement of the network topology definition module with a different network topology definition module changes the network topology and communication connectivity, allowing the computing resources to be tailored to particular needs.

20 Claims, 8 Drawing Sheets

NETWORK TOPOLOGY MODULE AND SYSTEM

FIELD

This disclosure relates to computing architectures and means for reconfiguring computing architectures.

BACKGROUND

Many computing architectures have a network topology or configuration that is tied to the underlying network technology. One example is switched Ethernet. Altering the network topology typically requires a change to nonvolatile RAM or to field programmable gate array (FPGA) code, or in some cases a change in optical cable route-path or a cable adjustment on a manual patch panel.

SUMMARY

A computing architecture and network topology definition module are described which provide the ability to tailor a hardware network topology to differing needs, whereby the topology may be changed quickly, with minimal equipment and without requiring re-cabling and/or adjustments to subsystem computing equipment. The concepts described herein can be used in a large number of applications where tailorable computing topology is desirable. Examples of applications include, but are not limited to, environments where hardware subsystem topology must be reconfigured/redistributed to support multiple mission scenarios, space constrained computing environments where hardware subsystems need to be shared, and hardware manufacturing, testing and diagnostics applications.

In one example described herein, computing resources are interconnected into a network implementation using an optical wavelength division multiplexing (WDM) star/coupler approach. The overall topology for the network is defined by the network topology definition module, which is a removable device that defines the network topology and communication connectivity between the computing resources. In the case of the WDM star/coupler approach, the network topology definition module includes a passive star/coupler and wavelength filter components. Replacement of the network topology definition module with a different network topology definition module changes the network topology and communication connectivity, allowing the computing resources to be tailored to particular needs.

In one embodiment, the network topology definition module is electrically passive in that no electrical energy is routed to the network topology definition module to power optical devices within the module.

In one embodiment, a network topology definition module includes a module housing having an interior. The module housing includes a connector that detachably connects the module housing to a fiber optic interface port of the computing architecture. A plurality of fiber optic terminals and at least one electrically passive optical device are in the interior of the module housing. An optical interconnect(s), for example fiber optic cable(s) or an optical waveguide(s), optically connects the fiber optic terminals and the at least one electrically passive optical device.

In another embodiment, a system includes a computing architecture that includes a plurality of computing resources. A fiber optic interface port is connected to the computing architecture. In addition, a plurality of network topology definition modules are provided, each module defining a different network topology from the other modules. Each module includes a module housing having an interior, with the module housing including a connector that detachably connects the module housing to the fiber optic interface port. A plurality of fiber optic terminals and at least one electrically passive optical device are in the interior of the module housing, with an optical interconnect(s) optically connecting the fiber optic terminals and the at least one electrically passive optical device.

DRAWINGS

Figure 3:
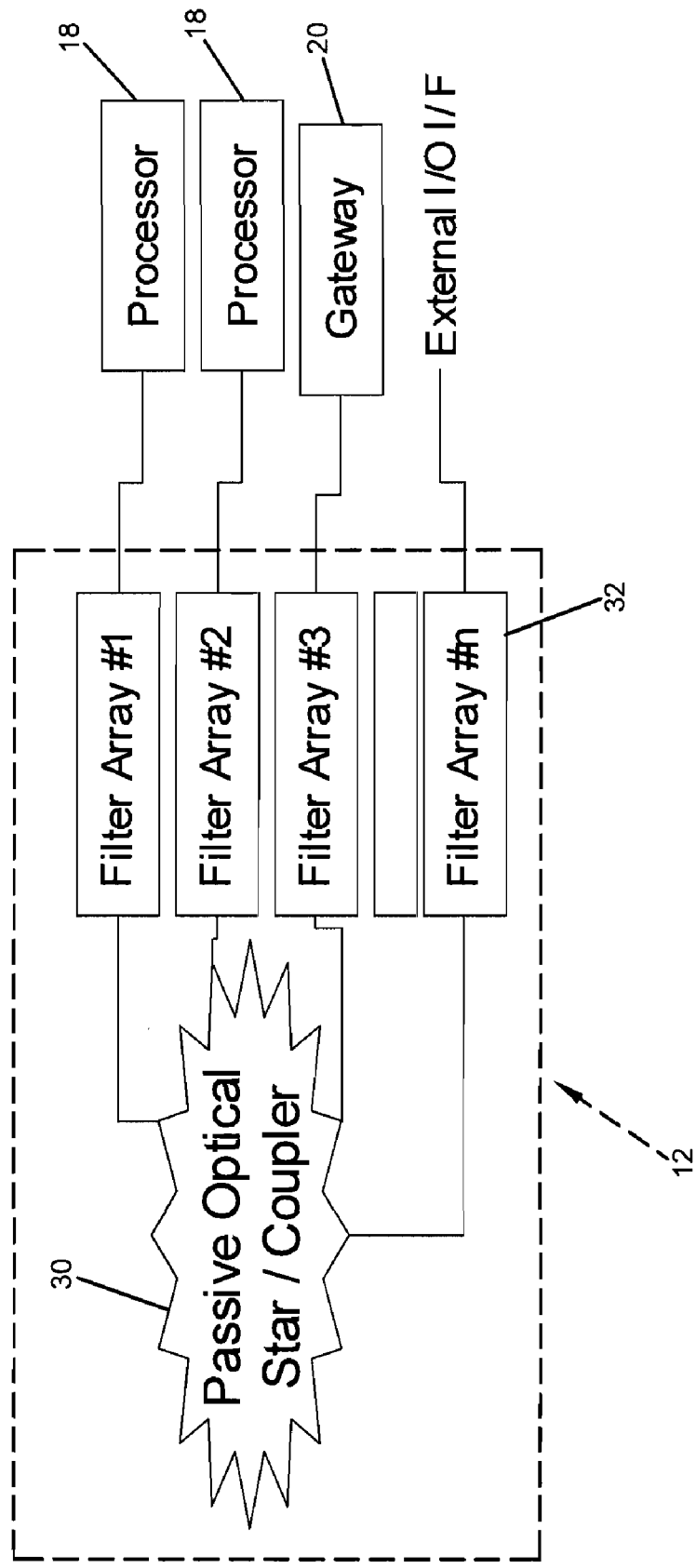

FIG. 3 schematically illustrates an example of optical devices within the network topology definition module.

Figure 4:
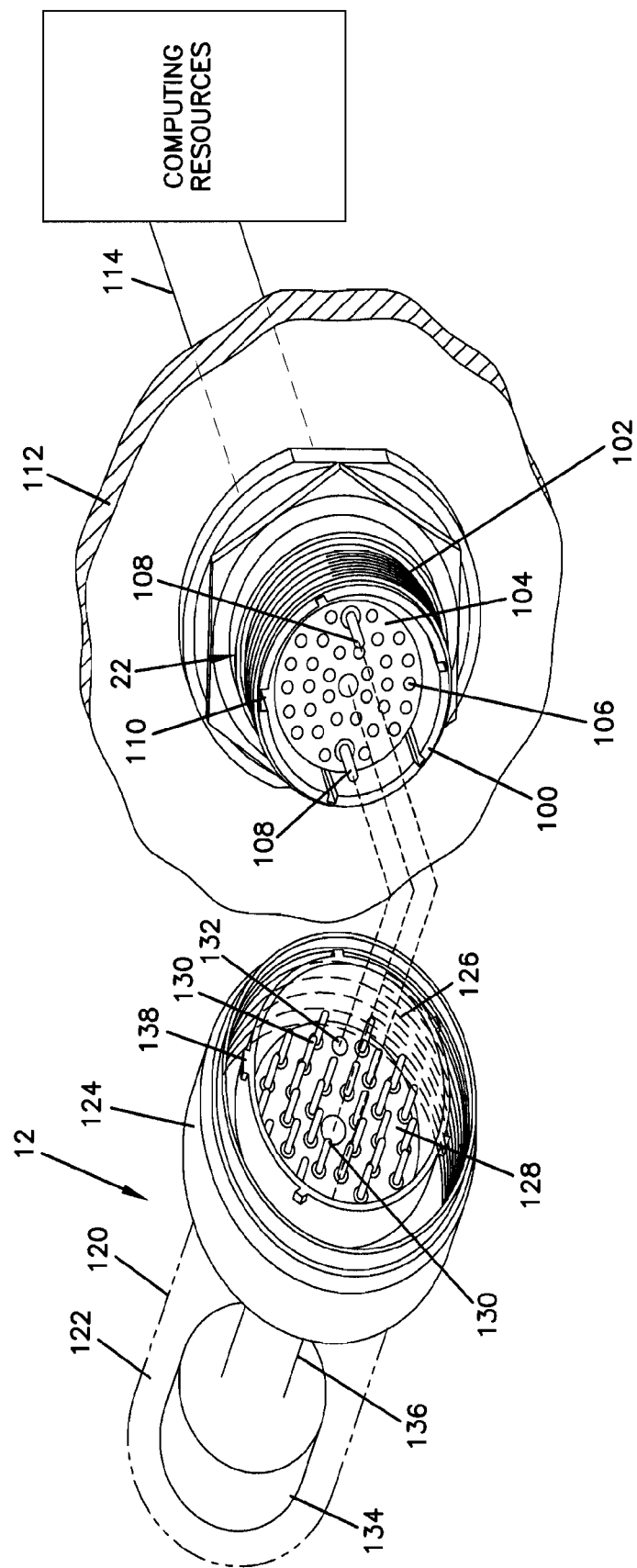

FIG. 4 is a cross-sectional view of the network topology definition module and the optical interface port of the computing architecture.

Figure 5:
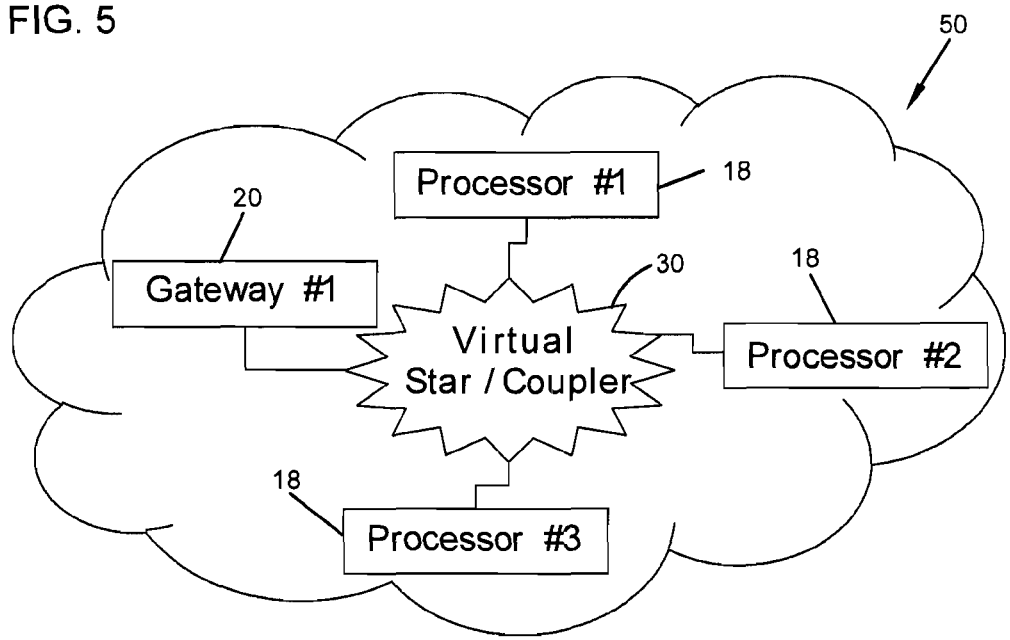

FIG. 5 illustrates an example network topology using one network topology definition module.

Figure 6:
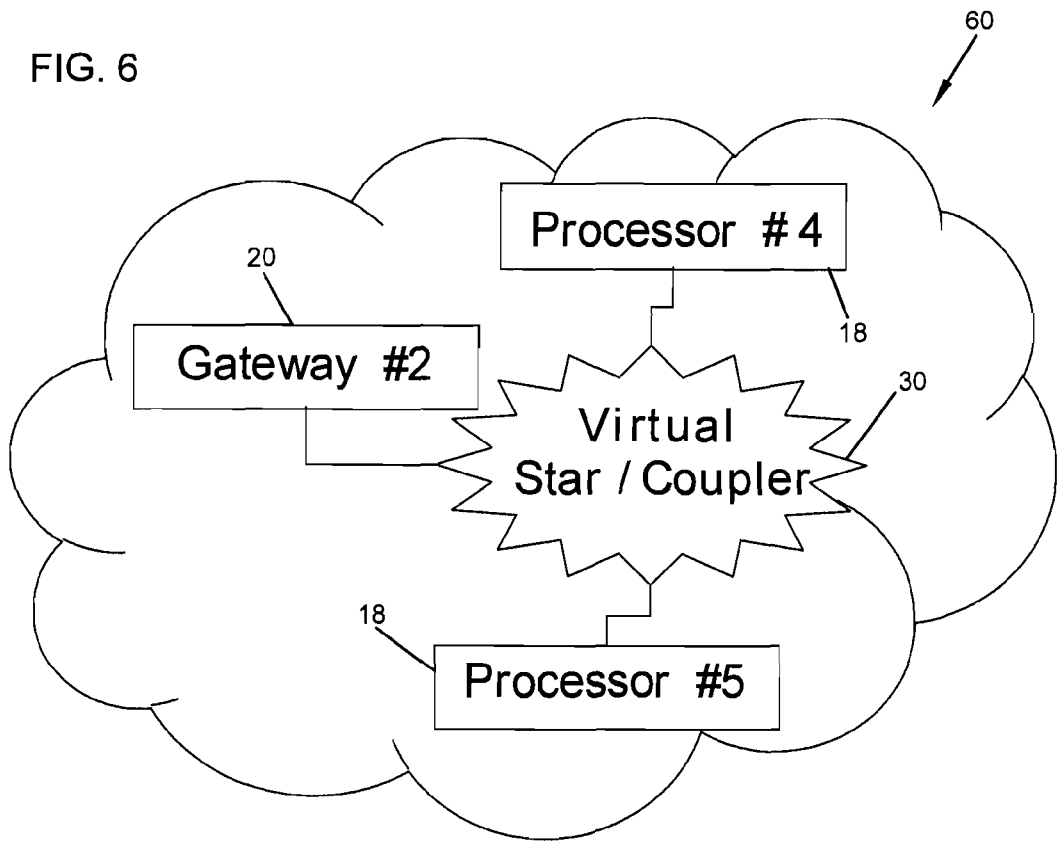

FIG. 6 illustrates an example network topology using a different network topology definition module.

Figure 7:
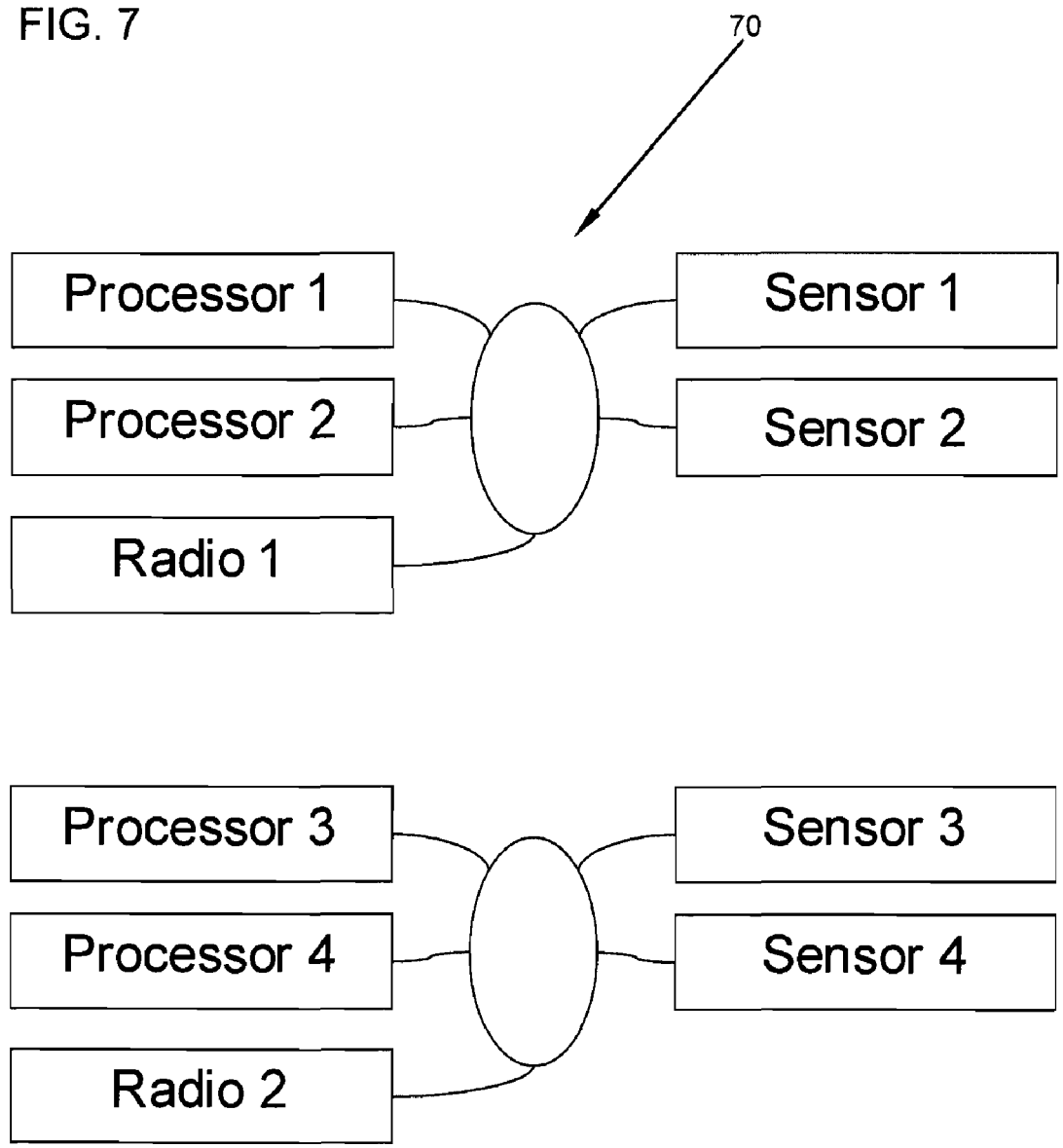
Figure 8:
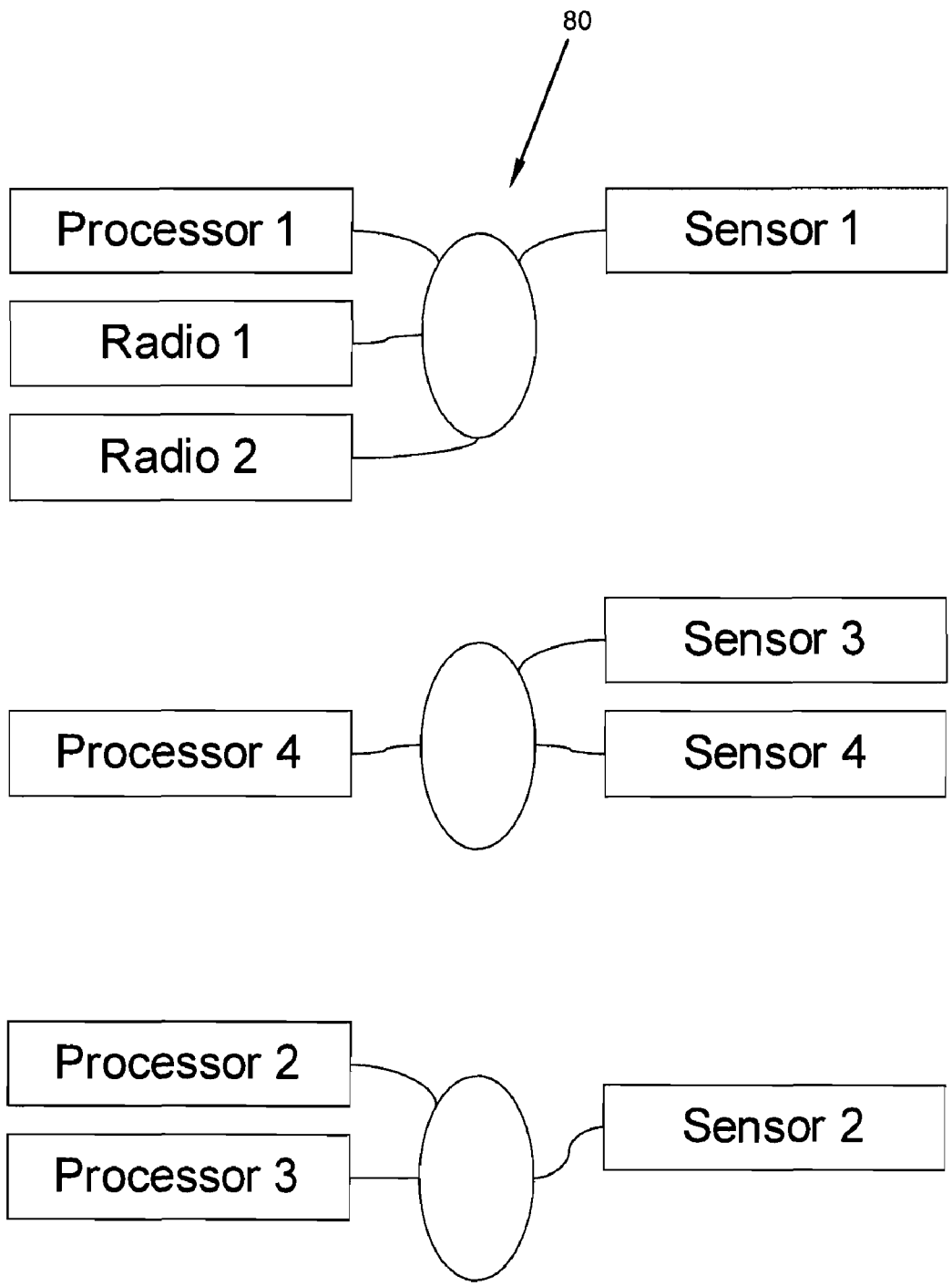

FIGS. 7 and 8 illustrate additional examples of network topologies that can be achieved using different network topology definition modules.

Figure 9:
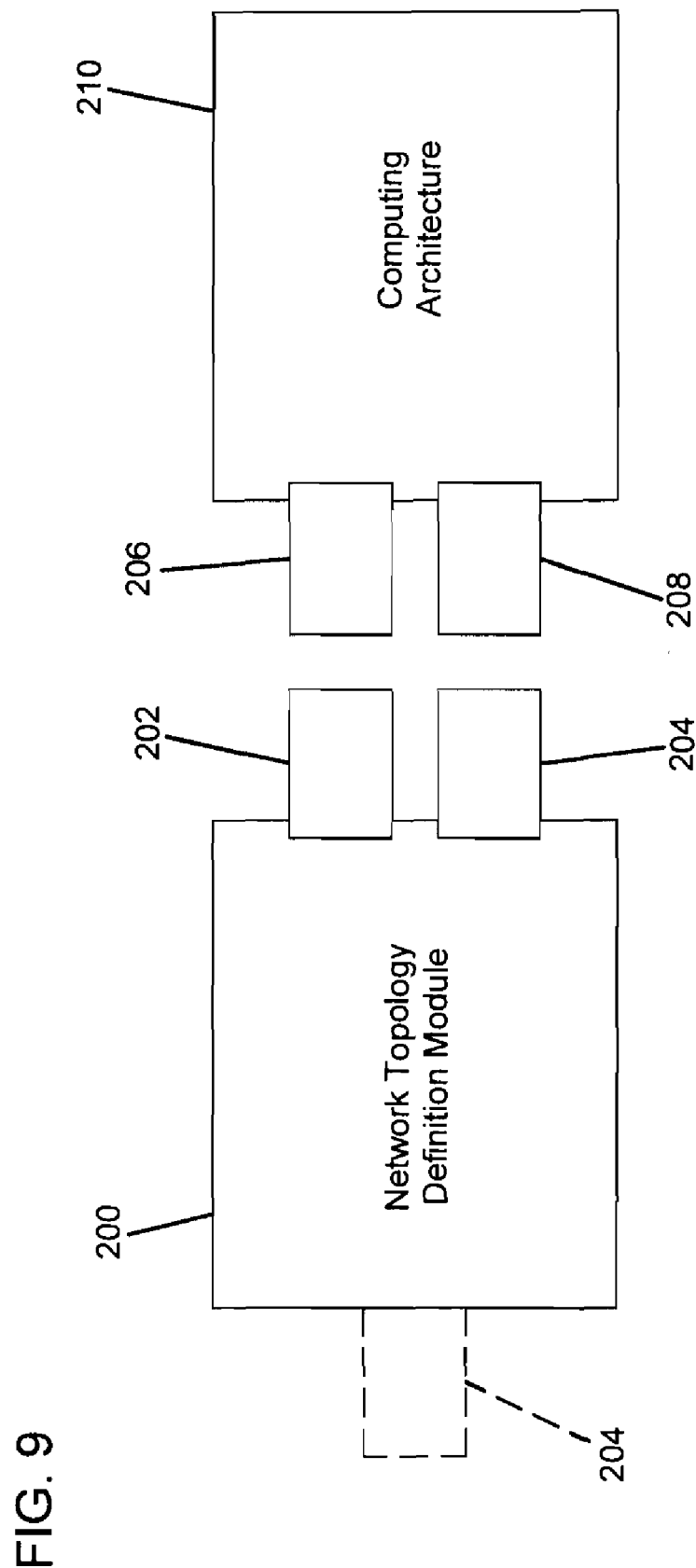

FIG. 9 illustrates another example of a network topology definition module.

DETAILED DESCRIPTION

Figure 1:
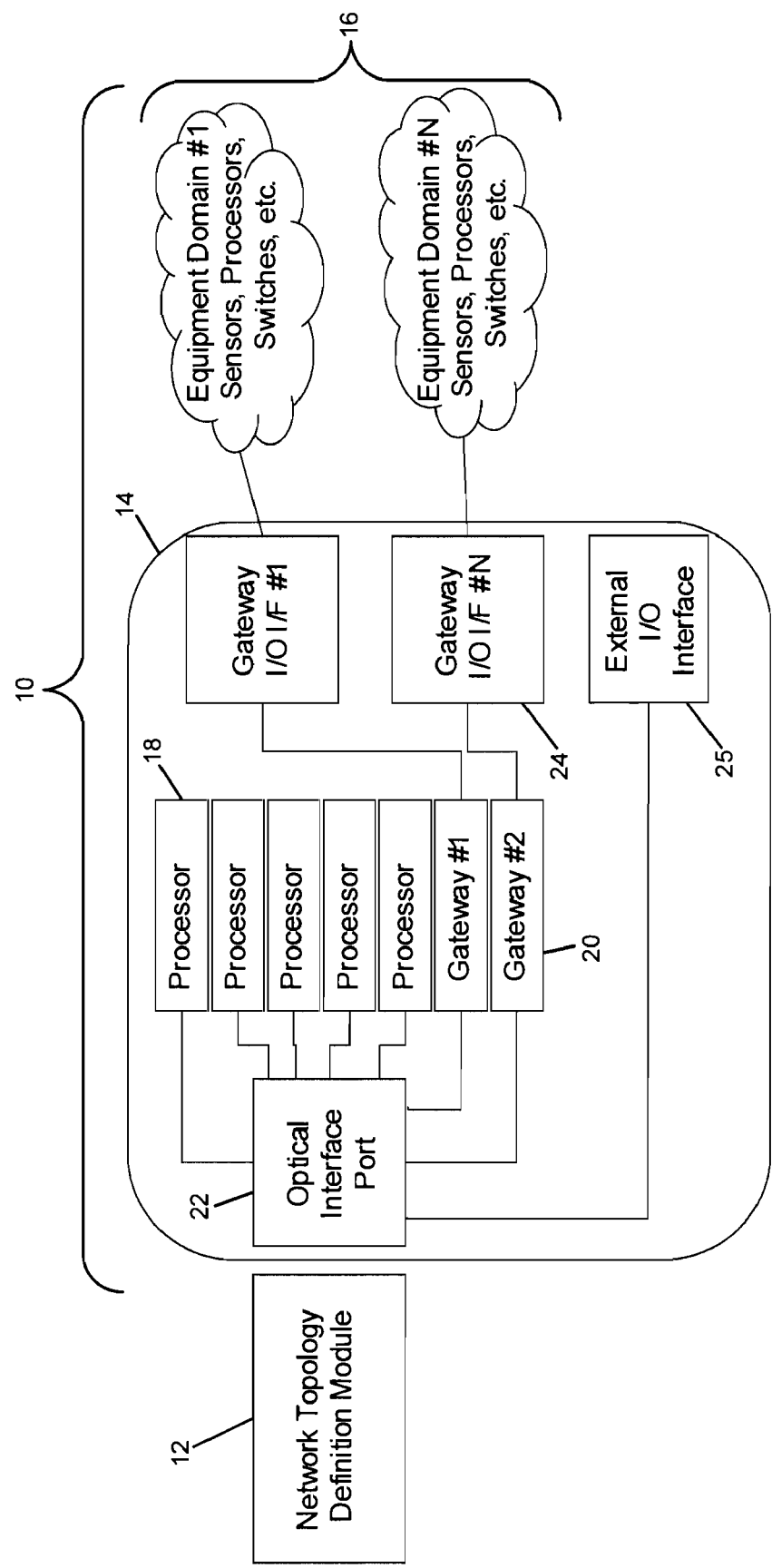
FIG. 1 is a schematic depiction of a network topology definition module and a computing architecture.

With reference to FIG. 1, a computing architecture 10 and network topology definition module (NTDM) 12 are illustrated which provide the ability to tailor a topology of the computing architecture to differing needs, where the topology of the computing architecture may be changed quickly by replacing the NTDM 12 with a different NTDM 12.

The computing architecture 10 can take on a number of different configurations and can be designed for use in a large number of applications where tailorable computing topology is desirable. Examples of applications include, but are not limited to, environments where hardware subsystem topology must be reconfigured/redistributed to support multiple mission scenarios, space constrained computing environments where hardware subsystems need to be shared, and hardware manufacturing, testing and diagnostics applications. One example environment where the computing architecture 10 can be used is on an aircraft such as fighter aircraft.

In the example illustrated in FIG. 1, the computing architecture 10 includes a plurality of computing resources, including a processor chassis 14 and a plurality of separate subsystems 16 connected to the chassis 14. As used herein, the term "computing resources" is intended to encompass resources that actually perform computing functions, i.e. perform mathematical and/or logical operations, such as a processor, as well as encompass resources, both hardware and software, that are non-computing, i.e. do not perform mathematical and logical operations, such as gateways, sensors, switches, radios, and other resources that may be used in conjunction with resources that perform computing functions.

The chassis 14 comprises a plurality of individual processors 18, a plurality of gateways 20, an optical interface port 22, and a plurality of gateway input/output interfaces 24. The processors 18 can be any combination of general purpose and/or specific purpose processors used in computing architectures including, for example, general purpose processors, data processors, graphics processors, and digital signal processors. Although five processors 18 are illustrated, any number of processors 18 can be provided, including one processor and more than five processors.

The gateways 20 are any means, implemented in hardware and/or software, capable of interfacing the chassis 14 with the subsystems 16. An example of a gateway includes, but is not limited to, a router, switch or a media converter. Although two gateways 20 are illustrated, any number of gateways can be provided, include one gateway and more than two gateways.

The optical interface port 22 is connected to the processors 18 and the gateways 20 allowing optical inputs and optical outputs. The optical interface port 22 is designed to connect to the NTDM 12 to change the network topology and communication connectivity between the processors 18, the gateways 20 and the subsystems 16. Further details on the optical interface port 22 are described below with respect to FIGS. 2 and 4.

The gateway I/O interfaces 24 interface the gateways 20 with the subsystems 16. The interfaces 24 can be electrical or optical, but are preferably optical interfaces with a construction similar to the interface port 22. In the illustrated embodiment, the number of interfaces 24 is equal to the number of gateways 20 and to the number of subsystems 16. However, to reduce the number of interfaces, the gateways and the subsystems can share a gateway interface 24.

An external I/O interface 25 can also be connected to the interface port 22 to permit other equipment, for example test equipment, to be connected to the network. The interface 25 is optional depending upon whether one wants the ability to connect external equipment to the network.

The subsystems 16 are any component(s) that can be attached to the chassis 14 including, but not limited to, sensors, processors, switches, radios, displays, storage devices, printers, servers, scanners, voice over IP systems, workstations, personal computers, etc. A subsystem 16 can be a single component or multiple components, and each subsystem can have different components. The subsystems 16 are separate from each other and any number of subsystems 16, including none, can be provided.

Instead of being in a separate subsystem, some of the components can be included on the chassis 14, eliminating the need for a gateway to interface directly to the NTDM 12.

The NTDM 12 is a device that is configured to be removably attached to the interface port 22 for determining the topology of the architecture 10. The NTDM 12 is provided with one or more electrically passive optical devices that determine the resulting network topology and communication connectivity between the various computing resources. The optical devices, and the entire NTDM 12, are electrically passive, eliminating the need to route electrical power to the NTDM 12. This simplifies the construction of the NTDM 12, and facilitates replacement of the NTDM 12 by a different NTDM 12 having differently configured optical devices to result in a different network topology and communication connectivity between the various computing resources. Thus, by having a number of differently configured NTDMs 12, the network topology can be quickly and easily changed by replacing one NTDM 12 with an NTDM 12 that provides the desired topology.

The optical device(s) in the NTDM 12 can be any device(s) suitable for achieving the desired network topology and communication connectivity between the various computing resources. To help explain the concept of the NTDM 12, the optical devices in the NTDM will be described as being an electrically passive optical star/coupler 30 together with a plurality of filter arrays 32 as illustrated in FIG. 3.

FIG. 5 illustrates an example network topology 50 using one NTDM, where the topology includes three of the processors 18 and one gateway 20 in communication via the star/coupler 30. FIG. 6 illustrates an example network topology 60 using a differently configured NTDM, where the topology includes two of the processors 18 and a gateway 20 in communication via the star/coupler 30.

FIG. 7 illustrates a network topology 70 where two networks are formed from a single NTDM, with each network including two processors, a radio and two sensors in communication via the star/coupler.

FIG. 8 illustrates a network topology 80 where three networks are formed from a single NTDM. One network includes a processor, two radios and a sensor. The second network includes a processor and two sensors. The third network includes two processors and a sensor.

Figure 2:
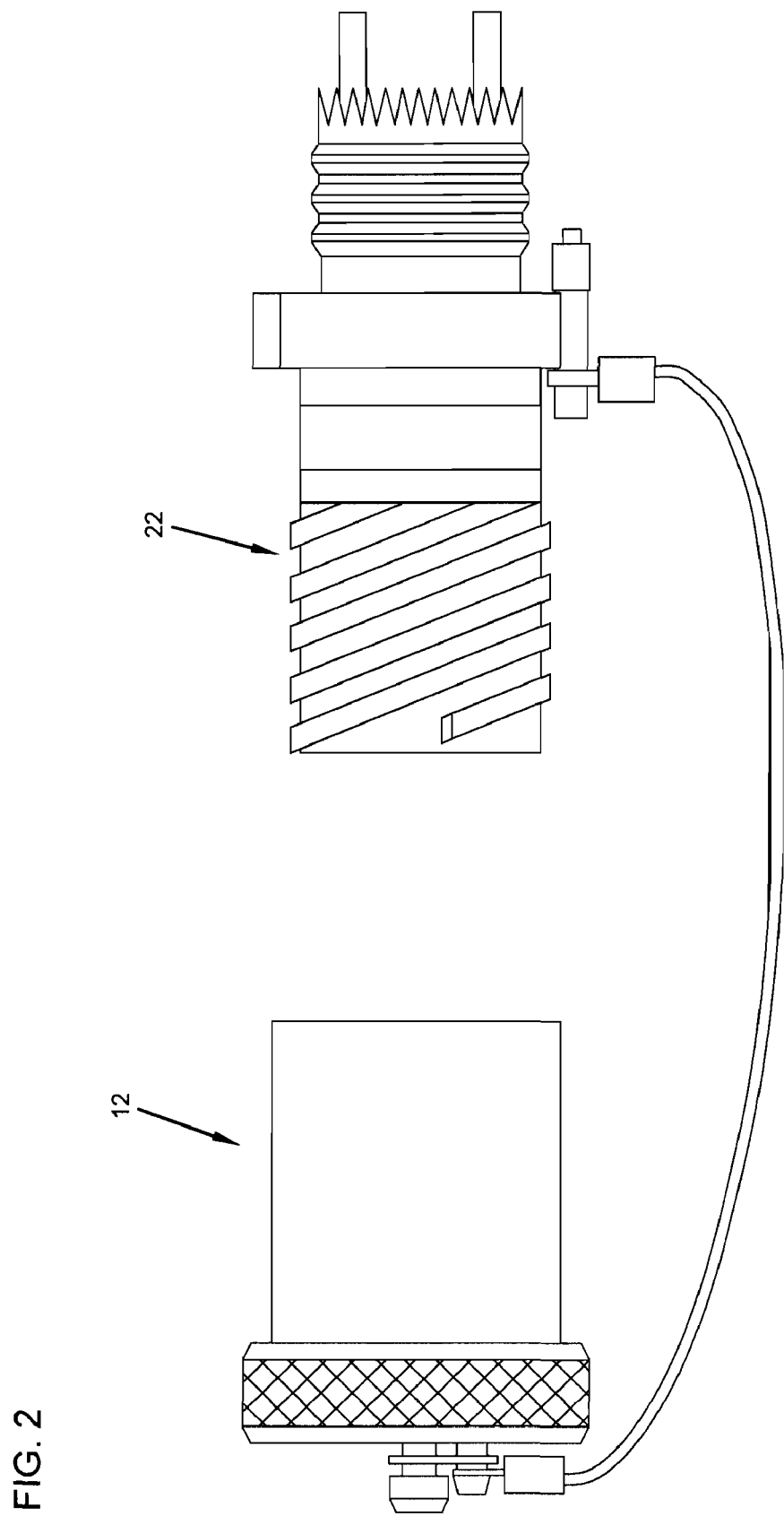
FIG. 2 illustrates an example of the network topology definition module and an optical interface port of the computing architecture.

With reference now to FIGS. 2-4, a specific example of the NTDM 12 and the interface port 22 are illustrated. The interface port 22 is of conventional construction including a port body 100 having exterior connection threads 102. The interior of the port body 100 includes a wall 104 having a plurality of fiber optic terminals 106, for example sockets, and a pair of alignment pins 108 extending from the wall 104. The inner surface of the body 100 includes alignment structure 110, in particular alignment slots, designed to receive mating alignment structure, in particular alignment ribs, on the NTDM 12 to facilitate correct positional alignment of the NTDM 12 and the port 22. The port 22 is mounted on a suitable support structure 112, for example a wall or bulkhead when used on an aircraft. The port 22 is connected via fiber optic cables 114 or other optical interconnect means to the computing resources, such as the processors and the gateways, whereby optical inputs and optical outputs are routed through the port 22.

Each NTDM 12 includes a generally cylindrical module housing 120 having an interior 122. The NTDM includes a connector 124 on the module housing 120 that detachably connects the module housing 120 to the interface port 22. Any type of connector 124 that can connect the housing 120 to the port 22 can be used. In the illustrated example, the connector 124 is a sleeve that is rotatably mounted on the module housing 120 for rotation relative to the housing. The sleeve includes interior threads 126 engageable with the exterior threads 102 of the port 22 to connect the NTDM to the port when the sleeve is rotated in the correct direction. Other types of connectors, for example a bayonet type connector, can be used instead of threads.

FIG. 9 illustrates an example of a NTDM 200 that is provided with two connectors 202, 204 that function similarly to the connector 124 so that each connector 202, 204 is configured to connect the NTDM 200 to separate interface ports 206, 208, similar to the port 22, on computing architecture 210. The use of two connectors 202, 204 is useful in situations where there are too many termini to fit into a single connector.

In another alternative embodiment of an NTDM, the second connector 204 can be provided at the opposite end of the NTDM as illustrated in dashed lines in FIG. 9, in which case each end of the NTDM housing would be open to allow access to optical termini. This type of configuration would allow the NTDM to connect to another NTDM or to other equipment.

When two connectors are used, the connectors need not be the same type of connector. For example, one connector can be a female connector and one connector can be a male connector, or one connector can use threads and one connector can be a bayonet type connector.

A wall 128 is fixed in the interior 122, and a plurality of fiber optic terminals 130, for example pins, are mounted on the wall 128. The pins extend from the wall 128 for mating engagement within the sockets of the port 22. Because they are mounted on the wall 128, the terminals 130 are fixed in the module housing 120 so that the terminals are not movable relative to the module housing. Alternatively, the NTDM could be provided with sockets as the terminals 130, while the port 22 is provided with pins as the terminals 106. Alignment holes 132 are formed in the wall 128 and receive therein the alignment pins 108 of the port 22. In one example, the connector of the NTDM complies with MIL-STD-38999. In another example, the terminals 130 comply with MIL-PRF-29504.

At least one electrically passive optical device 134 is disposed in the interior 122 of the module housing 120. As discussed above, the optical device 134 can be the star/coupler 30 by itself, or together with the filter arrays 32 as illustrated in FIG. 3. An optical interconnect(s) 136, for example fiber optic cable(s) or optical waveguide(s), optically connect the fiber optic terminals 130 and the optical device 134 to pass optical signals between the terminals 130 and the device 134.

In addition, alignment structure 138, in particular alignment ribs, are provided on the housing 120 to engage with the alignment structure 110 on the port 22 to facilitate correct positional alignment of the NTDM 12 and the port 22.

The NTDM 12 and port 22 could have other configurations. For example, the alignment structure 138 on the NTDM could be the alignment slots, while the alignment structure 110 on the port could be the ribs. In addition, the NTDM could have the alignment pins 108 while the port 22 has the alignment holes 132.

In use, the NTDM 12 providing the desired network topology is selected. The NTDM is then secured onto the port 22 by first aligning the alignment structures, bringing the NTDM into engagement with the port 22, and then using the connector 124 to detachably secure the NTDM to the port 22. The NTDM determines the topology of the computing resources available in the computing architecture 10. If it is desired to change the topology, for example to reconfigure the topology to support a new mission requirement, the first NTDM is removed, and a new NTDM providing the desired topology is secured to the port 22.

The examples disclosed in this application are to be considered in all respects as illustrative and not limitative. The scope of the invention is indicated by the appended claims rather than by the foregoing description; and all changes which come within the meaning and range of equivalency of the claims are intended to be embraced therein.

The invention claimed is:

1. A network topology definition module comprising:
    a module housing having an interior, the module housing including a connector at an end thereof that detachably connects the module housing to a fiber optic interface port;
    a plurality of fiber optic terminals in the interior of the module housing, the fiber optic terminals are located at the end of the module housing and are surrounded by the connector, and the fiber optic terminals are configured to pass an input optical signal into the module housing and pass an output optical signal from the module housing;
    at least one electrically passive optical device in the interior of the module housing; and
    an optical interconnect optically connecting the fiber optic terminals and the at least one electrically passive optical device that is configured to pass input and output optical signals between the fiber optical terminals and the at least one electrically passive optical device.

2. The network topology definition module of claim 1, wherein no electrical power is provided to the module whereby the module is electrically passive.

3. The network topology definition module of claim 1, wherein the connector is moveable relative to the module housing, and the plurality of fiber optic terminals are fixed in the module housing so that the plurality of fiber optic terminals are not movable relative to the module housing.

4. The network topology definition module of claim 1, wherein the plurality of fiber optic terminals are fiber optic pins or fiber optic sockets, and the fiber optic terminals are mounted on a wall that is fixed in the interior of the module housing and the fiber optic terminals and the wall are spaced from the at least one electrically passive optical device.

5. The network topology definition module of claim 1, wherein the plurality of fiber optic terminals, the at least one electrically passive optical device and the optical interconnect are disposed entirely in the interior of the module housing.

6. A network topology definition module comprising:
    a module housing having an interior, the module housing including a connector that detachably connects the module housing to a fiber optic interface port, the module housing is cylindrical;
    a plurality of fiber optic terminals in the interior of the module housing;
    at least one electrically passive optical device in the interior of the module housing; and
    an optical interconnect optically connecting the fiber optic terminals and the at least one electrically passive optical device.

7. The network topology definition module of claim 1, wherein the module housing includes alignment structure that facilitates alignment with mating alignment structure on a fiber optic interface port.

8. The network topology definition module of claim 1, comprising a plurality of the electrically passive optical devices in the interior of the module housing.

9. The network topology definition module of claim 1, wherein the housing includes a second connector that detachably connects the module housing to a fiber optic interface port.

10. A system comprising:
    a computing architecture that includes a plurality of computing resources;
    a fiber optic interface port connected to the computing architecture;
    a plurality of network topology definition modules, each module defining a different network topology from the other modules, and each module includes:
        a module housing having an interior, the module housing including a connector at an end thereof that detachably connects the module housing to the fiber optic interface port;
        a plurality of fiber optic terminals in the interior of the module housing, the fiber optic terminals are located at the end of the housing and are surrounded by the connector, and the fiber optic terminals pass an input optical signal into the module housing and pass an output optical signal from the module housing;
        at least one electrically passive optical device in the interior of the module housing; and an optical interconnect optically connecting the fiber optic terminals and the at least one electrically passive optical device that passes input and output optical signals between the fiber optical terminals and the at least one electrically passive optical device.

11. The system of claim 10, wherein no electrical power is provided to the modules whereby each of the modules is electrically passive.

12. The system of claim 10, wherein for each module: the connector is moveable relative to the module housing, and the plurality of fiber optic terminals are fixed in the module housing so that the plurality of fiber optic terminals are not movable relative to the module housing.

13. The system of claim 10, wherein for each module: the plurality of fiber optic terminals are fiber optic pins or fiber optic sockets, and the fiber optic terminals are mounted on a wall that is fixed in the interior of the module housing and the fiber optic terminals and the wall are spaced from the at least one electrically passive optical device.

14. The system of claim 10, wherein for each module: the plurality of fiber optic terminals, the at least one electrically passive optical device and the optical interconnect are disposed entirely in the interior of the module housing.

15. The system of claim 10, wherein for each module: the module housing is cylindrical.

16. The system of claim 10, wherein the module housing of each module further includes alignment structure that facilitates alignment with mating alignment structure on the fiber optic interface port.

17. The system of claim 10, wherein each module comprises a plurality of the electrically passive optical devices in the interior of the respective module housing.

18. The system of claim 10, wherein the plurality of computing resources are selected from: processors, gateways, sensors, switches, and radios.

19. The system of claim 10, wherein one of the computing resources comprises a gateway, the computing architecture further includes a fiber optic gateway interface port connected to the gateway, and the fiber optic gateway interface port is interfaced with a subsystem.

20. The system of claim 10, wherein the module housing includes a second connector that detachably connects the module housing to a second fiber optic interface port.

\* \* \* \* \*